(12) United States Patent
Labauze

(10) Patent No.: US 6,204,322 B1
(45) Date of Patent: Mar. 20, 2001

(54) SILICA-FILLED ELASTOMER COMPOSITION WHICH CAN BE USED FOR TIRES

(75) Inventor: Gérard Labauze, Clermont-Ferrand (FR)

(73) Assignee: Compagnie Generale des Establissements, Clermont-Ferrand (FR)

( * ) Notice: Subject to any disclaimer, the term of this patent is extended or adjusted under 35 U.S.C. 154(b) by 0 days.

(21) Appl. No.: 09/234,265

(22) Filed: Jan. 20, 1999

Related U.S. Application Data

(62) Division of application No. 08/861,184, filed on May 21, 1997, now Pat. No. 5,925,713, which is a continuation of application No. 08/415,607, filed on Apr. 3, 1995, now abandoned.

(30) Foreign Application Priority Data

Jul. 15, 1994 (FR) .................................. 94 08886

(51) Int. Cl.$^7$ .................................................. C08K 27/00
(52) U.S. Cl. .................... 524/572; 525/332.1; 525/383; 525/385; 525/342; 152/450
(58) Field of Search ........................... 524/572; 152/450; 525/332.1, 383, 385, 342

(56) References Cited

U.S. PATENT DOCUMENTS

| | | |
|---|---|---|
| 4,185,042 | 1/1980 | Verkouw . |
| 4,379,891 | 4/1983 | Haynes . |
| 4,666,981 | 5/1987 | Doura et al. . |
| 5,066,721 | 11/1991 | Hamada et al. . |
| 5,567,235 | 10/1996 | Carson et al. . |

OTHER PUBLICATIONS

J.T. Byers and M.P. Wagner, *Rubber Technology:Fillers*, Maurice Morton, ed.., 3rd ed. (1987).

Primary Examiner—Peter D. Mulcahy
(74) Attorney, Agent, or Firm—Baker Botts LLP

(57) ABSTRACT

A sulfur-vulcanizable rubber composition which in vulcanized state is of improved hysteresis, comprising silica as reinforcing filler and a polymer which is coupled and/or starred by means of an agent having the general formula:

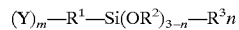

in which

Y represents the radical

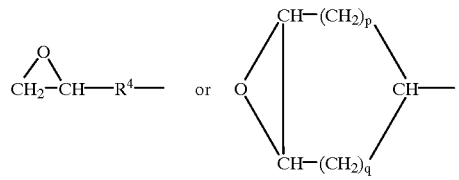

$R^1$ represents an alkyl, cycloalkyl, or aryl radical having 1 to 10 carbon atoms, $R^2$ represents an alkyl, aryl, cycloalkyl, alkaryl or aralkyl radical having from 1 to 12 carbon atoms, $R^3$ represents an alkyl, aryl or alkaryl radical having 1 to 12 carbon atoms, $R^4$ represents a hydrocarbon radical having 1 to 6 carbon atoms and may comprise one or more oxygen atoms in the hydrocarbon chain, n is a whole number selected from among the values 0 and 1, m is a whole number selected from among the values 1 and 2, p and q are whole numbers selected from among the values 0, 1, 2, 3, and 4, it being understood that the sum of p+q must represent a whole number between 2 and 5 inclusive.

18 Claims, No Drawings

SILICA-FILLED ELASTOMER COMPOSITION WHICH CAN BE USED FOR TIRES

This is a divisional of application Ser. No. 08/861,184, filed May 21, 1997, now U.S. Pat. No. 5,925,713, which is a file wrapper continuation of Ser. No. 08/415,607 filed Apr. 3, 1995 now abandoned.

BACKGROUND OF THE INVENTION

The present invention relates to a rubber composition having a base of coupled and/or starred diene polymers comprising silica as reinforcing filler, which can be used for the manufacture of tires.

Since fuel economy and the necessity of protecting the environment have become a priority, it is desirable to produce polymers having good mechanical properties and a hysteresis which is as small as possible, in order to be able to use them in the form of rubbery compositions which can be employed for the manufacture of various semi-finished products entering into the constitution of tires, such as, for instance, under-layers, calendering or sidewall rubbers, or treads and to obtain tires having improved properties, in particular reduced resistance to rolling.

In order to achieve this, numerous solutions have been proposed which consist, in particular, or modifying, inter alia, the nature of the diene polymers and copolymers for polymerization by means of coupling or starring agents or functionalizing agents. All these solutions are concentrated essentially on the use of polymers modified with carbon black as reinforcing filler in order to obtain good interaction between the modified polymer and the carbon black, since the use of reinforcing white fillers, and in particular of silica, has proven unsuitable due to the low level of certain properties of such compositions, and therefore of certain properties of tires using these compositions. Furthermore, the use of silica raises difficulties in working due to silica/silica interactions which tend in raw state to cause an agglomeration of the silica particles before and even after mixing and thus to increase the consistency of the rubber compositions, and in any event to make the working more difficult than the working of carbon black. By way of illustrative examples of this prior art, we may cite U.S. Pat. No. 3,135,716, which describes the reaction of living diene polymers at the chain end with a polyfunctional organic coupling agent in order to obtain polymers having improved properties; U.S. Pat. No. 3,281,383 which, as coupling or grafting agents of living diene polymers, describes polyepoxides, polyisocyanates, polyimines, polyaldehydes, polyketones, polyanhydrides, polyesters and polyhalides, including polyhalogenated compositions of silicon; U.S. Pat. No. 3,244,664 which describes tetraalkoxysilanes as coupling and/or starring agent for diene polymers; French Patent 69 24444, which describes as starring agent compositions comprising either the —O—C(O)—O— group or the —O—C(O)—R—C(O)—O— group and which leads to diene polymers having improved working properties and properties in vulcanized state. U.S. Pat. No. 4,185,042 describes diene polymers coupled or starred by means of silicon compounds comprising an epoxide group, the coupling and/or starring agent being present in an amount of 0.05 to 4 moles per mole of living polymer or copolymer having the properties both of an elastomer and of a thermoplastic. There is no reference therein to filled mixtures and nothing permits the person skilled in the art to believe that such polymers could be of interest for compositions comprising silica as reinforcing filler.

The interest in using silica as reinforcing filler in elastomer compositions has existed for a long time, but the use of silica as reinforcing filler has remained very limited due to the drawbacks mentioned above, and this despite the attempts made to remedy the deficiency of the properties exhibited by such compositions. Thus, it has been proposed to use functionalized diene polymers instead of non-functionalized polymers. By way of example of such prior art, mention may be made of European Patent Application EP 0 299 074, which describes a silica-filled diene rubber having a base of a diene polymer functionalized by means of a silane having a non-hydrolyzable alkoxy radical. European Patent Application EP 0 447 066 describes a silica-filled composition containing a diene polymer functionalized by means of a halogenated silane compound. Despite the improvement in the properties obtained with use of such functionalized polymers, the silica compositions described in this prior art have not proved usable for forming the treads of tires, since the properties exhibited, although improved, nevertheless remain insufficient with respect to the level required. This interest in silica-reinforced compositions has recently been reawakened with the publication of European Patent Application EP 0 501 227 which discloses a sulfur-vulcanizable rubber composition obtained by thermomechanical working of a conjugated diene copolymer and an aromatic vinyl compound prepared by solution polymerization with 30 to 150 parts by weight to 100 parts by weight of elastomer of a special precipitated silica obtained by the process forming the object of European Patent Application EP 0 157 703.

SUMMARY OF THE INVENTION

The applicant has now surprisingly discovered that diene polymers coupled and/or starred with a coupling or starring agent which is an epoxidized alkoxysilane compound make it possible to decrease the hysteresis of an elastomeric composition having a base of said coupled and/or starred polymers comprising silica as reinforcing filler and furthermore to improve other properties.

The object of the present invention is a rubber composition having a base of coupled and/or starred polymers having improved hysteresis.

The invention also concerns semi-finished components which can be used in the manufacture of tires, in particular treads, as well as tires having reduced rolling resistance. The invention concerns a sulfur-vulcanizable rubber composition having a base of a diene polymer, characterized by the fact that it comprises silica as reinforcing filler and by the fact that the diene polymer is a coupled and/or starred polymer comprising 30% to 100% of chains coupled and/or starred with a coupling or starring agent having general formula I:

$$(Y)_m\text{—}R^1\text{—}Si(OR^2)_{3-n}\text{—}R^3{}_n$$

in which
Y represents the radical

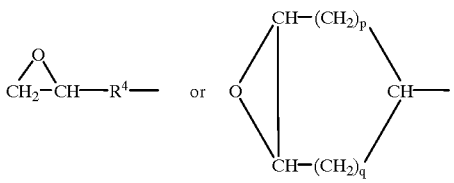

R$^1$ represents an alkyl, cycloalkyl or aryl radical having 1 to 10 carbon atoms, R$^2$ represents an alkyl, aryl, cycloalkyl, alkaryl or aralkyl radical having from 1 to 12 carbon atoms, R$^3$ represents an alkyl, aryl or alkaryl radical having 1 to 12 carbon atoms, R$^4$ represents a hydrocarbon radical having 1 to 6 carbon atoms and may comprise one or more oxygen atoms in the hydrocarbon chain, n is a whole number selected from among the values 0 and 1, m is a whole number selected from among the values 1 and 2, p and q are whole numbers selected from among the values 0, 1, 2, 3 and 4, it being understood that the sum of p+q must represent a whole number between 2 and 5 inclusive.

Among the coupling and/or starring agents with general formula I, are preferably suitable 2-glycidoxyethyl-trimethoxysilane, 3-glycidoxypropyl-trimethoxysilane (GPTSI), 3-glycidoxypropyl-triethoxysilane, and 2-(3,4-epoxycyclo-hexyl)-ethyltrimethoxysilane (ECETSI).

By diene polymers there is understood any homopolymer obtained by polymerization of a conjugated diene monomer having from 4 to 12 carbon atoms or any copolymer obtained by copolymerization of one or more conjugated dienes with each other or with one or more aromatic vinyl compounds having from 8 to 20 carbon atoms. As conjugated dienes there are suitable, in particular, butadiene-1,3, 2-methyl-1,3-butadiene, the 2,3-di(C$_1$ to C$_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, etc.

As aromatic vinyl compounds are suitable, in particular, styrene, ortho-, meta-, and para-methylstyrenes, the commercial "vinyl-toluene" mixture, para-tertiobutylstyrene, the methoxy-styrenes, the chloro-styrenes, vinyl mesitylene, divinyl benzene, vinyl naphthalene, etc.

The copolymers may contain between 99% and 20% by weight of diene units and 1% to 80% by weight of aromatic vinyl units. The polymers may have any microstructure, this being a function of the polymerization conditions used, in particular the presence or absence of a modifying and/or randomizing agent and the quantities of modifying and/or randomizing agents used. The polymers may be block, statistical, sequenced, microsequenced polymers, etc., and may be prepared by dispersion or in solution.

There are preferred, polybutadienes, particularly those having a content of between 4% and 80% 1,2-units, polyisoprenes, butadiene-styrene copolymers, in particular those having a styrene content of between 5% and 50% by weight and, more particularly, between 20% and 40% by weight, a content of 1,2 bonds of the butadiene part of between 4% and 65% and a content of trans-1,4 bonds of between 30% and 80%. In the case of butadiene-styrene-isoprene copolymers, are suitable those having a styrene content of between 5 and 50% and, more particularly, between 10% and 40%, an isoprene content of between 15% and 60% by weight, and more particularly between 20% and 50% by weight, a butadiene content of between 5 and 50%, and more particularly between 20% and 40% by weight, a content of 1,2 units of the butadiene part of between 4% and 85%, a content of trans-1,4 units of the butadiene part of between 6% and 80%, a content of 1,2 plus 3,4 units of the isoprene part of between 5% and 70%, and a content of trans-1,4 units of the isoprene part of between 10% and 50%.

Living polymers are obtained in known manner by polymerization of the monomer or monomers with a polymerization initiator. Any anionic or non-monofunctional initiator known can be used. However, an initiator containing an alkaline metal such as lithium or an alkaline-earth metal such as barium is preferred. Representative compounds are the aliphatic organolithiums such as ethyl lithium, n-butyl lithium (n-BuLi), isobutyl lithium, etc. Representative compounds containing barium are those described, for instance, in patent applications FR-A-2 302 311 and FR-A-2 273 822, and certificates of addition FR-A-2 338 953 and FR-A-2 340 958, the disclosure of which is incorporated herein. In the examples, the agent/initiator ratio expresses the molar ratio of coupling agent to number of active polymerization sites of the initiator.

As known per se, the polymerization is preferably carried out in the presence of an inert solvent, which can, for instance, be an aliphatic or alicyclic hydrocarbon such as pentane, hexane, heptane, iso-octane or cyclohexane, or an aromatic hydrocarbon such as benzene, toluene or xylene.

The polymerization can be carried out continuously or batchwise. The polymerization is generally carried out at a temperature of between 20° C. and 120° C., and preferably close to 30° to 90° C. One can, of course, also add a transmetallation agent at the end of the polymerization in order to modify the reactivity of the living chain end.

The coupled and/or starred diene polymers are obtained, as known per se, by reacting the living diene polymer with the coupling and/or starring agent. The coupling and/or starring reaction is preferably carried out with a quantity of coupling or starring agent caused to react with the living diene polymer such that the molar ratio of starring agent of formula I to active polymerization initiator is between 0.05 and 1.0. One example of a process of preparing coupled and/or starred diene polymers is described in U.S. Pat. No. 4,184,042, the disclosure of which is incorporated herein. Of course, one or more compounds of formula I can be used as coupling and/or starring agent. The coupled and/or starred polymer can have antioxidizing agents added before recovery and be separated from the reaction medium by conventional techniques, that is to say either by coagulation or by steam stripping of the solvent, or else by evaporation by any means whatsoever, such as evaporation under vacuum and then drying if necessary.

By coupled and/or starred diene polymers there are understood polymers entirely or substantially coupled and/or starred by means of at least one compound of general formula I, that is to say polymers comprising 30% to 100% of polymer chains coupled and/or starred by means of a compound of general formula I. The coupling and/or starring of the polymers can, of course, be effected in one or more steps, with one or more compounds of general formula I. The reality of the coupling and/or starring reaction can be shown by means of the apparent degree of starring (ADS) which is equal to the ratio of the molecular weights of the functionalized polymer and the non-functionalized polymer;

the higher this ratio, the more it expresses extensive coupling and/or starring. The coupled and/or starred diene polymers used under the compositions of the invention preferably have an apparent degree of starring equal to or greater than 2, but which may drop to 1.20. The coupled and/or starred polymers can, in accordance with the present invention, comprise up to 70% polymer chains coupled and/or starred in accordance with any of the processes known to the person skilled in the art by means of other coupling and/or starring agents known in the prior art such as, for instance, tin derivatives, propyleneglycol carbonate, etc., and/or chains functionalized by means of a compound of general formula I or by means of any other functionalizing agent known in the prior art such as, for instance, appropriate derivatives of benzophenone or of tin, a halogenated or non-halogenated alkoxysilane compound, etc.

In the manner which could not be foreseen by the person skilled in the art, it has been discovered that starred and/or grafted diene polymers confer improved properties on a composition which uses them and contains silica as reinforcing filler. First of all, they make it possible to decrease the hysteresis of such silica-filled compositions, which makes these compositions particularly useful for the manufacture of semi-finished products which can be used as components of tires, in particular treads, under-layers, side-wall rubbers, and calendering rubbers.

Furthermore, it has been discovered that these coupled and/or starred diene polymers confer upon the non-vulcanized compositions containing at least in part silica as reinforcing filler improved properties of use, in particular, an extrudability or a suitability for making strips by means of an improved extruder. It has also been discovered that these coupled and/or starred diene polymers confer improved mechanical strength and mechanical cohesion upon vulcanized compositions which are reinforced with silica. In other words, it has been discovered that these coupled and/or starred diene polymers make it possible to confer upon compositions containing silica as reinforcing filler a compromise of raw working properties, mechanical resistance, mechanical cohesion, and very satisfactory hysteresis, making it possible to use these compositions in the manufacture of tires having reduced resistance to rolling.

This effect, which is beneficial with respect to the properties, is obtained with all the precipitated silicas known to the person skilled in the art which have a BET surface which is less than or equal to 450 $m^2/g$, a specific CTAB surface which is less than or equal to 450 $m^2/g$, even though this improvement is more pronounced with a highly dispersible precipitated silica. By highly dispersible silica there is understood any silica having a very substantial ability of disagglomeration and dispersion in a polymer matrix as observed by electronic or optical microscopy on thin sections. As non-limitative examples of such preferred highly dispersable silicas mention may be made of those described in European patent applications EP-A 0 157 703 and EP-A 0 520 862, for the silica Zeosil 1165 MP of Rhône Poulenc, or the silica Perkasil KS 340 of Akzo, or the silica Hi-Sil 2000 of PPG.

The beneficial effect is obtained whatever the physical state in which the silica is present, that is to say whether it is present in the form of a powder, microbeads, granules or balls and whatever the specific surface of the silica. When both silica and carbon black are used as reinforcing fillers in compositions, improved properties are obtained with respect to both the unvulcanized compositions and the vulcanized compositions. One can, of course, also use blends of different silicas and use other white fillers.

As carbon blacks, all carbon blacks are suitable and, in particular, all carbon blacks which are commercially available or conventionally used in tires and particular in the treads of tires. The amount of carbon black present may vary within wide limits, it being understood, however, that the improvement in the properties will be greater the higher the amount of silica present. The quantity of carbon black present is preferably equal to or less than 200% of the amount of silica present in the composition.

The coupled and/or starred polymers can be used alone in the rubber of blending compositions together with any other diene elastomer, in particular with any elastomer conventionally used in the treads of tires. It is, however, obvious that the greater the proportion of conventional elastomer present in the composition constituting the tread of a tire, the less the improvement will be. This is why the conventional elastomer, such as natural rubber, polybutadiene, polyisoprene, a butadiene-styrene copolymer or a butadiene-styrene-isoprene copolymer, etc., may be present in an amount of between 1 and 70 parts by weight to 100 parts of coupled and/or starred polymer. This conventional elastomer can, of course, itself be a coupled and/or starred elastomer or else be functionalized with a coupling and/or starring or functionalizing agent other than one satisfying formula I, or else an elastomer functionalized with an functionalizing agent of formula I.

The compositions in accordance with the invention may also contain the other components and additives customarily used in rubber mixes, such as plasticizers, pigments, antioxidants, sulfur, vulcanization accelerators, extension oils, one or more silica coupling or bonding agents and/or one or more covering agents of the silica such as alkoxysilanes, polyols, amines, etc.

The invention is illustrated, but not limited, by the examples, which in no way constitute a limitation on the scope of the invention.

DESCRIPTION OF PREFERRED EMBODIMENTS

In the examples, the properties of the compositions are evaluated as follows:

Modulus of elongation at 300% (ME 300), 100% (ME 100) and 10% (ME 10): measurements effected in accordance with ISO Standard 37

Scott index of breakage: measured at 20° C. and at 100° C.,

Rupture force (RF) in MPA

Elongation upon rupture (ER) in %

Hysteresis losses (HL): measured by rebound at 60° C.

Dynamic properties in shear:

Measurements as a function of deformation: carried out at 10 Hertz with a peak-peak deformation ranging from 0.15% to 50%. The non-linearity expressed is the difference in shear modulus between 0.15% and 50% deformation in MPa. The hysteresis is expressed by the measurement of tan δ at 7% deformation.

Measurements as a function of temperature: carried out at 10 Hertz under a repetitive stress of 20 $N/cm^2$ with a temperature sweep from −80° C. to 100° C.

The hysteresis is expressed by the measurement of tan δ at 0° C. and 60° C. in accordance with ASTM Standard D2231-71 (reapproved in 1977).

For all examples, the inherent viscosity (dl/g) is measured at 25° C. in a 1 g/L solution in toluene.

EXAMPLE 1

The purpose of this example is to describe a batchwise manner of carrying out the process for the preparation of coupled and/or starred diene polymers which makes it possible to obtain compositions having improved properties in accordance with the invention.

In this example, two identical tests are carried out. In one of the tests, a coupling and/or starring agent is used, while in the other test methanol is used at the end of polymerization. Into a 10-liter reactor under nitrogen pressure there are introduced 6.35 L of toluene as solvent and then 500 g of 1,3-butadiene, and finally 250 ppm of THF as vinyl-bond-promoting agent. n-BuLi is then added in an amount suitable to neutralize the impurities present in the reaction medium, after which 0.00333 moles of n-BuLi is added, representing the amount of initiator active for initiating the polymerization. The polymerization is effected at 60° C. for 48 minutes and the conversion percentage measured is 100%. GPTSI (sold by Huls under the commercial name DYNASYLAN GLYMO) is added in suitable amount for Test 2 and methanol in the case of Test 1 to the reactor which contains the polybutadiene having a living C-lithium end. The coupling and/or starring reaction is carried out at 60° C. After 2 minutes, 0.5 parts of 2,2'-methylene bis (4-methyl-6-tertiobutylphenol) per hundred parts of elastomer is added as antioxidizing agent. The polybutadiene obtained for each of the tests is coagulated in methanol and then dried at 50° C. under reduced pressure for 36 hours.

For each of the polymers, the final inherent viscosity, the Mooney viscosity (1+4 at 100° C.), the number molecular weight (Mn) by osmometry and the apparent degree of starring are measured.

The results are set forth in Table I.

TABLE I

| Test | Agent/Initiator | Inherent Viscosity | Mooney Viscosity | Mn × 10³ | ADS |
|---|---|---|---|---|---|
| 1 | 0 | 1.97 | 25 | 135 | 1.0 |
| 2 | 0.5 | 2.57 | 82 | 210 | 1.6 |

EXAMPLE 2

The purpose of this example is to describe a continuous manner of carrying out the preparation of the coupled and/or starred diene polymer which makes it possible to obtain compositions having improved properties in accordance with the invention.

Into a reactor having a useful capacity of 32 liters provided with an agitator of turbine type, there are continuously introduced toluene, butadiene, styrene and THF in a weight ratio of 100:10:4.3:0.3, and a solution of 530 micromoles of active n-BuLi per 100 grams of monomers. The rates of flow of these different solutions are calculated so as to have an average dwell time of 45 minutes, with strong agitation. The temperature is maintained constant at 60° C. At the outlet of the reactor, the measured conversion is 88%. The SBR copolymer contains 26% incorporated styrene and has a content of 41% of 1,2 bonds for the butadiene part.

The coupling and/or starring agent is added at the outlet of the reactor. Four tests are carried out with different amounts of GPTSI. The coupling and/or starring reaction is carried out at 60° C. After 2 minutes, 0.8 part per hundred parts of copolymer of 2,2'-methylene bis(4-methyl-6-tertiobutyl phenol) and 0.2 part of N-(1,3-dimethylbutyl)-N'-phenyl-p-phenylenediamine are added as antioxidants. The copolymer is recovered and then subjected to the conventional steam stripping operation and then dried in the oven at 50° C.

The results are set forth in Table II.

TABLE II

| Test | Agent/Initiator | Inherent Viscosity | Mooney Viscosity | Mn × 10³ | ADS |
|---|---|---|---|---|---|
| 3 | 4.13 | 2.28 | 84 | 196 | 1.11 |
| 4 | 1.65 | 2.33 | 86 | 207 | 1.18 |
| 5 | 0.83 | 2.43 | 91 | 220 | 1.25 |
| 6 | 0.20 | 2.62 | 109 | 240 | 1.36 |
| 7 | 0.15 | 2.78 | 119 | 245 | 1.39 |

EXAMPLE 3

The purpose of this example is to describe a continuous manner of preparing a coupled and/or starred butadiene-styrene-isoprene copolymer making it possible to obtain a composition having the improved properties in accordance with the invention.

Into a reactor of a useful capacity of 32 liters having an agitator of turbine type there are continuously introduced toluene, butadiene, styrene, isoprene and THF in a weight ratio of 100:3.0:4.0:4.1:0.06 and a solution of 10 micromoles of active n-BuLi to 100 g of monomers. The rates of flow of these different solutions are calculated so as to have a dwell time of 45 minutes. The temperature is maintained constant at 75° C. At the outlet of the reactor, the measured conversion is 81%. The SBIR terpolymer contains 25% incorporated styrene and 33% incorporated butadiene having a content of 1,2 bonds of 25%, the content of 3,4 bonds for the isoprene portion being 20%.

At the outlet of the reactor, the GPTSI is added, and the coupling and/or starring reaction is carried out at 60° C. Within the control test 9, methanol is added in place of the GPTSI, in an amount such that there is a ratio of methanol to initiator of 2.

After 2 minutes, 0.8 part per hundred parts of terpolymer of 2,2'-methylene bis(4-methyl-6-tertiobutyl-phenol) and 0.2 part of N-(1,3-dimethylbutyl)-N'-phenyl-p-phenylenediamine are added as antioxidants. The terpolymer is recovered and then subjected to the conventional steam stripping operation, and dried in the oven at 50° C. The inherent viscosities are measured before the stripping operation.

The results are set forth in Table III.

TABLE III

| Test | Functionalization Agt. | Agent/Init. | Inh. Visc. | Mooney Visc. | Mn × 10³ | ADS |
|---|---|---|---|---|---|---|
| 8 | GPTSI | 0.20 | 2.72 | 92 | 255 | 1.34 |
| 9 | — | — | 2.16 | 54 | 190 | 1 |

EXAMPLE 4

The object of this example is to describe a continuous method of preparing of coupled and/or starred dienes which makes it possible to obtain compositions having improved properties in accordance with the invention to compare them with compositions having the same formulation but a base of polymers coupled and/or starred with other coupling and/or starring agents, all the compositions having substantially the same Mooney viscosity in unvulcanized state.

The manner of operation of Example 2 is repeated, except that GPTSI, 2-(3,4-epoxycyclohexyl)-ethyltrimethoxysilane (ECETSI), tetramethoxy-silane (TMSI) and propyleneglycol carbonate (PGC) respectively are used as coupling and/or starring agents and that an amount of active initiator is used such that the value of the Mooney viscosity of the coupled and/or starred polymer is 70±3. The living polymer has a content of 1,2 bonds of 41% in the case of the butadiene part, a content of trans-1,4 bonds of 44%, and a content of incorporated styrene of 26%. An SBR stopped with methanol, designated SBRT, and an SBR functionalized with propyltrimethoxysilane (PTSI), designated SBRB, are also prepared.

The functionalization rate of the SBRB is determined by $^1$H NMR determination. The sample analyzed is recovered by several cycles of coagulation in methanol and dissolved with carbon disulfide in order to eliminate the presence of any trace of residual PTSI, that is to say that which is not bound to the polymer. The sample is then dried in the oven, in a vacuum, at 60° C. for 24 hours in order to eliminate any trace of solvent. The singulet signal of the protons of the $Si(OCH_3)_2$ unit corresponding to the functionalized chain ends is found at 3.32 ppm. On the basis of this spectrum, calculation makes it possible to determine that the polymer contains 0.034 unit of $Si(OCH_3)_2$ to 100 units of monomer, which corresponds to 5.0 millimoles of $SI(OCH_3)_2$ units per kilogram of polymer. The molecular weight of the unmodified polymer is 184,000 g/mole. The values thus obtained make it possible to determine the functionalization rate (ratio of number of $Si(OCH_3)_2$ chain end moles to the number of polymer moles before functionalization) which is 0.92.

The results are set forth in Table IV.

TABLE IV

| Test | Polymer | Coupling/ Starring Agent | Coupling/ Starring Agent n-BuLi | Mooney | ADS |
|---|---|---|---|---|---|
| 10 | SBRE | GPTSI | 0.20 | 70 | 1.38 |
| 11 | SBRE' | ECETSI | 0.35 | 69 | 1.25 |
| 12 | SBRF | TMSI | 0.40 | 70 | 1.39 |
| 13 | SBRG | PGC | 0.40 | 71 | 1.32 |

TABLE IV-continued

| Test | Polymer | Coupling/ Starring Agent | Coupling/ Starring Agent n-BuLi | Mooney | ADS |
|---|---|---|---|---|---|
| 14 | SBRB | PTSI | 1.5 | 72 | 1.03 |
| 15 | SBRT | MEOH | 1.5 | 69 | 1 |

These four coupled and/or starred SBR's are worked by thermomechanical working in two stages lasting 5 and 4 minutes respectively with an average speed of the pallets of 45 rpm until reaching a maximum temperature drop of 160° C., followed by a finishing stage carried out at 30° C. with the following formulation in which all parts are expressed by weight:

| | |
|---|---|
| Elastomer | 100 |
| Silica (*) | 75 |
| Aromatic oil (d) | 37.5 |
| Bonding agent (**) | 6 |
| Zinc oxide | 2.5 |
| Stearic acid | 1.5 |
| Antioxidant (a) | 1.9 |
| Paraffin wax (b) | 1.5 |
| Sulfur | 1.1 |
| Sulfenamide (c) | 2 |
| Diphenyl guanidine | 1.5 |

(*) the silica is a highly dispersible silica in the form of microbeads marketed by Rhône Poulenc under the trade name Zeosil 1165 MP.
(**) polysulfur organosilane marketed by Degussa under the name SI 69.
(a) antioxidant: N-(1,3-dimethylbutyl)-N'-phenyl-p-phenylenediamine
(b) paraffin wax: mixture of macrocrystalline and microcrystalline waxes
(c) sulfenamide: N-cyclohexyl-2-benzothiazyl sulfenamide
(d) aromatic oil: ENERGLEX 65, marketed by BP The above four compositions are compared with an identical composition using respectively SBRB functionalized with PTSI and the SBRT stopped with methanol.

The vulcanization is carried out at 150° C. for 40 minutes. The properties of the six compositions are compared with each other both in unvulcanized state and in vulcanized state.

The results are set forth in Table IV A.

TABLE IV A

| Compositions | SBRE | SBRE' | SBRF | SBRG | SBRB | SBRT |
|---|---|---|---|---|---|---|
| Conventional rubber properties | | | | | | |
| Mooney | 68 | 73 | 65 | 72 | 92 | 76 |
| Properties in vulcanized state | | | | | | |
| Shore hardness | 66 | 66 | 66 | 66 | 66 | 66 |
| ME10 | 5.00 | 5.00 | 5.20 | 5.30 | 5.10 | 5.40 |
| ME100 | 1.65 | 1.68 | 1.75 | 1.70 | 1.70 | 1.75 |
| ME300 | 1.90 | 1.95 | 1.90 | 1.80 | 1.99 | 1.78 |
| ME300/ME100 | 1.15 | 1.16 | 1.08 | 1.05 | 1.17 | 1.01 |
| Scott breakage indexes | | | | | | |
| 20° C. RF | 21.5 | 21.5 | 22 | 23 | 22.5 | 22 |
| 20° C. ER % | 600 | 620 | 600 | 650 | 630 | 650 |
| 100° C. RF | 8.5 | 9 | 9 | 9.2 | 8.9 | 8.5 |
| 100° C. ER % | 400 | 420 | 450 | 450 | 420 | 450 |
| HL at 60° C.* | 30 | 29 | 31.5 | 32 | 27 | 32 |

TABLE IV A-continued

| Compositions | SBRE | SBRE' | SBRF | SBRG | SBRB | SBRT |
|---|---|---|---|---|---|---|
| Dynamic properties as a function of deformation | | | | | | |
| AG at 23° C. | 3.30 | 3.30 | 3.80 | 4.20 | 3.30 | 4.50 |
| tan δ at 23° C. | 0.31 | 0.30 | 0.36 | 0.38 | 0.31 | 0.39 |
| Dynamic properties as a function of temperature | | | | | | |
| tan δ G at 0° C. | 0.54 | 0.54 | 0.53 | 0.52 | 0.54 | 0.52 |
| tan δ at 60° C. | 0.155 | 0.155 | 0.160 | 0.175 | 0.150 | 0.180 |

(*) the deformation for this hysteresis loss is 34%.

It is seen that the vulcanized compositions SBRE and E' using coupled and/or starred polymers have an improved hysteresis property not only as compared with that shown by the SBRT composition, but substantially improved as compared with that of the SBRF and G compositions employing other starring and/or coupling agents including TMSI, making it possible to reach a level comparable to that exhibited by the composition SBRB, that is to say a level comparable to that exhibited by a functionalized polymer.

Furthermore, it is noted that the SBRE and E' compositions have properties of use such as extrudability and drawing on an extruder which are definitely superior to those of the functionalized SBRB composition and of the same level as those shown by the two other SBRF and G compositions employing starred polymers.

Furthermore, the SBRE and E' compositions have, in vulcanized state, a reinforcement (ME300/ME100 ratio) greater than that of the SBRF and G compositions and close to that of the SBRB composition.

EXAMPLE 5

The object of this example is to show that the improved properties are obtained whatever the specific surface of the silica and whatever its form of presentation.

In this example, two series of tests are carried out, the one employing in the form of microbeads a silica which has a specific BET surface area of 85 m²/g, sold under the trade name Zeosil 85 MP by Rhône Poulenc, the other employing a precipitated silica in the form of granules, marketed by Deguassa under the trade name Ultrasil VN3 and having a CTAB specific surface area of 170 m²/g.

For both series of tests, with the same formulation as that described in Example 4, four compositions are prepared, two thereof with the coupled and/or starred copolymers E and G prepared in Example 4, the third composition being made with the SBRB functionalized with PTSI, and the fourth composition being made with the SBRT stopped with methanol and serving as control composition.

The results are set forth in Table V.

TABLE V

| | ZEOSIL 85 MP | | | | ULTRASIL VN3 | | | |
|---|---|---|---|---|---|---|---|---|
| Compositions | SBRE | SBRB | SBRT | SBRG | SBRE | SBRB | SBRT | SBRG |
| Mooney | 53 | 72 | 57 | 57 | 63 | 92 | 71 | 71 |
| Properties in vulcanized state | | | | | | | | |
| Shore Hardness | 62 | 61 | 63 | 63 | 64 | 64 | 66 | 65 |
| ME10 | 3.90 | 3.80 | 4.00 | 4.00 | 4.90 | 4.90 | 5.20 | 5.10 |
| ME100 | 1.85 | 1.85 | 1.90 | 1.90 | 1.75 | 1.80 | 1.85 | 1.80 |
| ME300 | 2.78 | 2.86 | 2.75 | 2.75 | 1.85 | 2.01 | 1.87 | 1.85 |
| ME300 ME100 | 1.50 | 1.55 | 1.45 | 1.45 | 1.06 | 1.12 | 1.01 | 1.03 |
| Scott Breaking Indexes | | | | | | | | |
| 20° C. RF | 15 | 15.5 | 15 | 15 | 17.5 | 16.5 | 16 | 16.5 |
| 20° C. ER % | 430 | 400 | 450 | 450 | 550 | 500 | 600 | 600 |
| 100° C. RF | 5.5 | 5.1 | 4.8 | 4.8 | 6.5 | 6.5 | 6 | 6.5 |
| 100° C. ER % | 230 | 200 | 260 | 260 | 330 | 300 | 330 | 350 |
| HL at 60° C.* | 17 | 15 | 19 | 18 | 27.5 | 24 | 29 | 29 |

TABLE V-continued

| | ZEOSIL 85 MP | | | | ULTRASIL VN3 | | | |
|---|---|---|---|---|---|---|---|---|
| Compositions | SBRE | SBRB | SBRT | SBRG | SBRE | SBRB | SBRT | SBRG |
| Dynamic properties as a function of deformation | | | | | | | | |
| ΔG at 23° C. | 1.40 | 1.20 | 1.60 | 1.55 | 2.00 | 1.70 | 2.70 | 2.60 |
| tan δ at 23° C. | 0.17 | 0.16 | 0.20 | 0.19 | 0.27 | 0.23 | 0.30 | 0.29 |
| Dynamic properties as a function of temperature | | | | | | | | |
| tan δ 0° C. | 0.30 | 0.30 | 0.30 | 0.30 | 0.42 | 0.42 | 0.42 | 0.42 |
| tan δ 60° C. | .080 | .070 | .100 | .095 | .125 | .118 | .140 | .140 |

(*) The deformation for this hysteresis loss is 37% and 34% for the silicas Zeosil 85 MP and Ultrasil VN3 respectively.

It is noted that whatever the form of presentation, microbeads or granules, of the silica and whatever the specific surface area, the compositions employing the starred and/or coupled E copolymers have, as a whole, hysteresis properties upon strong and small deformations which are very substantially improved as compared with those exhibited by the other compositions G and T and very close to those exhibited by the functionalized SBRB. Furthermore, the coupled and/or starred E copolymers have improved properties of use in unvulcanized state as compared with those exhibited by the SBRB composition.

EXAMPLE 6

The object of this example is to show that the compositions using a coupled and/or starred polymer with a coupling and/or starring agent of general formula I have improved properties when the reinforcing filler is not formed exclusively of silica but, for instance, of a carbon black/silica blend.

In this example, the following formulation is used, while repeating the manner of operation of Example 4.

| | |
|---|---|
| Elastomer | 100 |
| Silica (*) | 40 |
| Carbon black N234 | 40 |
| Aromatic oil (d) | 37.5 |
| Bonding agent (**) | 3.2 |
| Zinc oxide | 2.5 |
| Stearic acid | 1.5 |
| Antioxidant (a) | 1.9 |
| Paraffin wax (b) | 1.5 |
| Sulfur | 1.1 |
| Sulfenamide (c) | 2 |
| Diphenyl guanidine | 0.75 |

(*), (**), (a), (b), (c), (d): identical to those used in Example 4.

TABLE VI

| Compositions | SBRT | SBRE | SBRG | SBRB |
|---|---|---|---|---|
| | Properties in raw state | | | |
| Mooney | 72 | 64 | 68 | 86 |
| | Properties in vulcanized state | | | |
| Shore hardness | 64 | 63 | 64 | 63 |
| ME10 | 4.55 | 4.25 | 4.45 | 4.10 |

TABLE VI-continued

| Compositions | SBRT | SBRE | SBRG | SBRB |
|---|---|---|---|---|
| ME100 | 1.50 | 1.52 | 1.48 | 1.51 |
| ME300 | 1.74 | 1.82 | 1.74 | 1.89 |
| ME300/ME100 | 1.16 | 1.20 | 1.18 | 1.24 |
| Scott breaking indexes at | | | | |
| 20° C. RF | 19 | 21 | 20 | 20.5 |
| 20° C. ER % | 620 | 630 | 630 | 610 |
| 100° C. RF | 9.5 | 9.5 | 10 | 9.9 |
| 100° C. ER % | 500 | 500 | 500 | 450 |
| HL at 60° C. | 39 | 35 | 38 | 33.5 |
| Dynamic properties as a function of deformation | | | | |
| ΔG at 23° C. | 6.30 | 5.00 | 6.00 | 4.40 |
| tan δ at 23° C. | 0.43 | 0.40 | 0.43 | 0.38 |
| Dynamic properties as a function of temperature | | | | |
| tan δ at 0° C. | 0.67 | 0.69 | 0.67 | 0.70 |
| tan δ at 60° C. | 0.220 | 0.210 | 0.220 | 0.200 |

(*) The deformation for this hysteresis loss is 35%.

It is noted that the properties of the composition comprising the polymer coupled and/or starred by means of the compound of general formula I are improved, in the case of a carbon-black/silica blend, as compared with those of the two SBRG and SBRT compositions at the level of the vulcanizate with regard to the mechanical reinforcement and the hysteresis loss with small and large deformations and very close to those exhibited by the composition SBRB.

I claim:

1. A tire tread having a base of a coupled and/or starred diene polymer, characterized by the fact that it comprises 10 to 100 parts by weight of a sulfur-vulcanizable rubber composition comprising silica as reinforcing filler and a coupled and/or starred polymer comprising 30% to 100% of chains coupled and/or starred by means of an agent having the general formula:

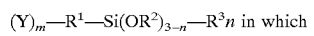

$(Y)_m$—$R^1$—$Si(OR^2)_{3-n}$—$R^3 n$ in which

Y represents the radical

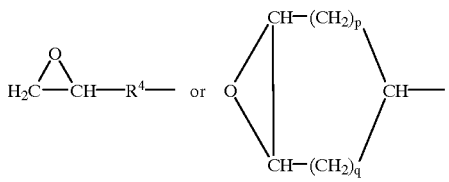

R[1] represents an alkyl, cycloalkyl or aryl radical having 1 to 10 carbon atoms, R[2] represents a methyl or ethyl radical, R[3] represents an alkyl, aryl or alkaryl radical having from 1 to 12 carbon atoms, R[4] represents a hydrocarbon radical having from 1 to 6 carbon atoms and may comprise one or more oxygen atoms in the hydrocarbon chain, n is whole number selected from among the values 0 and 1, m is whole number selected from among the values 1 and 2, p and q are whole numbers selected from among the values 0, 1, 2, 3, and 4, it being understood that the sum of p+q must represent a whole number between 2 and 5 inclusive.

2. A tire tread according to claim 1, characterized by the fact that the coupling and/or starring agent is selected from among 3-glycidoxypropltrimethoxysilane and 2-(3,4-epolycyclohexyll)-ethyltrimethoxysilane.

3. A tire tread according to claim 1, characterized by the fact that the silica is precipitation silica having a BET surface area less than of equal to 450 m$^2$/g, and a CTAB specific surface area less than or equal to 450 m$^2$/g.

4. A tire tread according to claim 3, characterized by the fact that the coupled and/or starred diene polymer is selected from the group consisting of polybutadiene and the copolymer butadiene-styrene or butadiene-styrene-isoprene.

5. A tire having a reduced resistance to rolling, characterized by the fact that it has a tread comprising 10 to 100 parts by weight of a sulfur-vulcanizable rubber composition comprising silica as reinforcing filler and a polymer coupled and/or starred by means of an agent having the general formula:

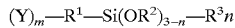

$(Y)_m\text{—}R^1\text{—}Si(OR^2)_{3-n}\text{—}R^3{}_n$ in which Y represents the radical

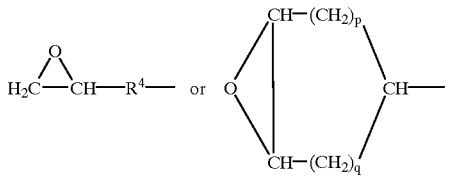

R[1] represents an alkyl, cycloalkyl, or aryl radical having from 1 to 10 carbon atoms, R[2] represents a methyl or ethyl radical, R[3] represents an alkyl, aryl, or alkaryl radical having from 1 to 12 carbon atoms, R[4] represents a hydrocarbon radical having from 1 to 6 carbon atoms and may comprise one or more oxygen atoms in the hydrocarbon chain, n is a whole number selected from among the values 0 and 1, m is a whole number selected from among the values 1 and 2, p and q are whole numbers selected from among the values 0, 1, 2, 3, and 4, it being understood that the sum of p+q must represent a whole number between 2 and 5 inclusive.

6. A tire tread according to claim 1, characterized by the fact that it comprises from 1 to 70 parts by weight of at least one other diene elastomer selected from the group consisting of natural rubber, polybutadiene, polyiosprene, butadiene-styrene, and butadiene-styrene-isoprene.

7. A tire tread according to claim 6, characterized by the fact that the diene elastomer is a coupled and/or starred and/or functionalized elastomer.

8. A tire tread according to claim 1, characterized by the fact that it further comprises carbon black.

9. A tire tread according to claim 8, characterized by the fact that the amount of carbon black is ≦200% referred to the amount of silica present.

10. A tire tread according to claim 3, characterized by the fact that the silica is a highly dispersable silica in the form of powder, microbeads, balls, or granules.

11. A tire according to claim 5, characterized by the fact that the coupling and/or starring agent is selected from among 3-glycidoxypropyltrimethoxysilane and 2-(3,4-epoxycyclohexyll)-ehtyltrimethoxysilane.

12. A tire according to claim 5, characterized by the fact that the silica is precipitation silica having a BET surface area less than of equal to 450 m$^2$/g, and a CTAB specific surface area less than or equal to 450 m$^2$/g.

13. A tire according to claim 12, characterized by the fact that the coupled and/or starred diene polymer is selected from the group consisting of polybutadiene and the copolymer butadiene-styrene or butadiene-styrene-isoprene.

14. A tire according to claim 5, characterized by the fact that it comprises from 1 to 70 parts by weight of at least one other diene elastomer selected from the group consisting of natural rubber, polybutadiene, polyiosprene, butadiene-styrene, and butadiene-styrene-isoprene.

15. A tire according to claim 14, characterized by the fact that the diene elastomer is a coupled and/or starred and/or functionalized elastomer.

16. A tire according to claim 5, characterized by the fact that it further comprises carbon black.

17. A tire according to claim 16, characterized by the fact that the amount of carbon black is ≦200% referred to the amount of silica present.

18. A tire according to claim 12, characterized by the fact that the silica is a highly dispersable silica in the form of powder, microbeads, balls, or granules.

* * * * *

UNITED STATES PATENT AND TRADEMARK OFFICE
CERTIFICATE OF CORRECTION

PATENT NO. : 6,204,322 B1
DATED : March 20, 2001
INVENTOR(S) : Labauze

It is certified that error appears in the above-identified patent and that said Letters Patent is hereby corrected as shown below:

Column 5,
Line 54, "dispersable" should read -- dispersible --

Column 6,
Line 45, "MPA" should read -- MPa --

Column 9,
Line 24, "SI(OCH$_3$)$_2$" should read -- Si(OCH$_3$)$_2$ --

Column 10,
Line 34, "ENERGLEX" should read -- ENERFLEX --

Column 11,
Table IV A-continued: "AG" should read -- ΔG --

Column 12,
Line 28, "Deguassa" should read -- Degussa --
Table V: "ME300" (second occurrence) should read -- ME300 --

Column 13,
Line 57, insert -- The results are set forth in Table VI. --

Column 14,
Line 65, "in which" should read -- ¶in which --

Column 15,
Lines 20 and 22, "whole" should read -- a whole --
Line 30, "3-glycidoxypropltrimethoxysilane" should read
-- 3-glycidoxypropyltrimethoxysilane --
Line 31, "epolycyclohexyll" should read -- epoxycyclohexyl --
Line 34, "of" should read -- or --

UNITED STATES PATENT AND TRADEMARK OFFICE
CERTIFICATE OF CORRECTION

PATENT NO. : 6,204,322 B1
DATED : March 20, 2001
INVENTOR(S) : Labauze

It is certified that error appears in the above-identified patent and that said Letters Patent is hereby corrected as shown below:

<u>Column 16,</u>
Line 18, "polyiosprene," should read -- polyisoprene, --
Line 30, "dispersable" should read -- dispersible --
Line 35, "epoxycyclohexyll" should read -- epoxycyclohexyl --
Line 35, "-ehtyltrimethoxysilane" should read -- -ethyltrimethoxysilane --
Line 38, "of" should read -- or --
Line 48, "polyiosprene," should read -- polyisoprene, --
Line 59, "dispersable" should read -- dispersible --

Signed and Sealed this

Ninth Day of July, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,204,322 B1
DATED : March 20, 2001
INVENTOR(S) : Gérard Labauze

It is certified that error appears in the above-identified patent and that said Letters Patent is hereby corrected as shown below:

<u>Title page,</u>
Item (73), Assignee, "Compagnie Generale des Establissements" should read
-- Compagnie Générale des Etablissements Michelin - Michelin & Cie --

Signed and Sealed this

Twenty-fifth Day of March, 2003

JAMES E. ROGAN
*Director of the United States Patent and Trademark Office*